United States Patent
Akuzawa et al.

(10) Patent No.: US 9,882,509 B2
(45) Date of Patent: Jan. 30, 2018

(54) RESONANT TYPE HIGH FREQUENCY POWER SUPPLY DEVICE AND SWITCHING CIRCUIT FOR RESONANT TYPE HIGH FREQUENCY POWER SUPPLY DEVICE

(71) Applicant: MITSUBISHI ELECTRIC ENGINEERING COMPANY, LIMITED, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Yuki Ito, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 0 days.

(21) Appl. No.: 15/028,650

(22) PCT Filed: Oct. 31, 2013

(86) PCT No.: PCT/JP2013/079544
§ 371 (c)(1),
(2) Date: Apr. 11, 2016

(87) PCT Pub. No.: WO2015/063916
PCT Pub. Date: May 7, 2015

(65) Prior Publication Data
US 2016/0241160 A1    Aug. 18, 2016

(51) Int. Cl.
*H02M 7/533* (2006.01)
*H02J 50/12* (2016.01)
(Continued)

(52) U.S. Cl.
CPC ............ *H02M 7/533* (2013.01); *H02J 50/12* (2016.02); *H02M 7/537* (2013.01);
(Continued)

(58) Field of Classification Search
CPC . H02J 50/20; H02J 50/12; H02J 50/23; Y02B 70/1441; Y02B 70/1491;
(Continued)

(56) References Cited

U.S. PATENT DOCUMENTS 6,570,777 B1    5/2003    Bennett
2006/0126253 A1*    6/2006    Urakabe ............... H02M 1/38
                                                    361/118
(Continued)

FOREIGN PATENT DOCUMENTS

JP    2003-224966 A    8/2003
JP    2006-353049 A    12/2006
(Continued)

OTHER PUBLICATIONS

Tamotsu INABA, "13.56 MHz, 150W." Transistor Technology, Feb. 2005, Chapter 13, pp. 209-210.
(Continued)

*Primary Examiner* — Gustavo Rosario Benitez
(74) *Attorney, Agent, or Firm* — Oblon, McClelland, Maier & Neustadt, L.L.P.

(57) ABSTRACT

Disclosed is a resonant type high frequency power supply device provided with a power element that performs a switching operation, the power supply device including a high frequency pulse drive circuit 1 that transmits a pulse-shaped voltage signal having a high frequency exceeding 2 MHz to the power element to drive the power element, wherein a voltage signal from the high frequency pulse drive circuit 1 is subjected to partial resonance by an impedance of a signal line of the voltage signal and a parasitic capacitance of the power element.

12 Claims, 15 Drawing Sheets

(51) Int. Cl.
*H02M 7/5383* (2007.01)
*H02M 7/537* (2006.01)
*H02M 1/00* (2006.01)
*H02M 7/48* (2007.01)

(52) U.S. Cl.
CPC ............... *H02M 7/53832* (2013.01); *H02M 2001/0058* (2013.01); *H02M 2007/4815* (2013.01); *Y02B 70/1441* (2013.01); *Y02B 70/1491* (2013.01)

(58) Field of Classification Search
CPC ............. H02M 7/53832; H02M 7/48; H02M 2007/4818; H02M 3/155; H02M 3/337; H02M 2007/4815; H02M 7/533; H02M 7/537; H02M 2001/0058
See application file for complete search history.

(56) References Cited

U.S. PATENT DOCUMENTS

| | | | |
|---|---|---|---|
| 2008/0204247 A1* | 8/2008 | Lian | G06K 7/0008 340/572.3 |
| 2010/0184371 A1* | 7/2010 | Cook | H02J 5/005 455/41.1 |
| 2011/0049997 A1 | 3/2011 | Urano | |
| 2012/0007679 A1* | 1/2012 | Burgener | H01Q 23/00 330/277 |
| 2013/0188408 A1* | 7/2013 | Yamamoto | H02J 5/005 363/140 |
| 2014/0253029 A1 | 9/2014 | Uchida et al. | |
| 2014/0368056 A1 | 12/2014 | Hosotani | |
| 2015/0032052 A1* | 1/2015 | Guardiani | A61N 1/3787 604/151 |
| 2015/0061579 A1 | 3/2015 | Katsunaga et al. | |
| 2015/0341087 A1* | 11/2015 | Moore | H04B 5/0031 455/77 |

FOREIGN PATENT DOCUMENTS

| | | |
|---|---|---|
| JP | 2011-78299 A | 4/2011 |
| JP | 2012-503469 A | 2/2012 |
| JP | 2013-27129 A | 2/2013 |
| WO | 2013/080285 A1 | 6/2013 |
| WO | 2013/133028 A1 | 9/2013 |

OTHER PUBLICATIONS

International Search Report dated Jan. 28, 2014 in PCT/JP2013/079544 filed Oct. 31, 2013.
Japanese Office Action dated Feb. 10, 2015 in Patent Application No. 2014-558347 (with English translation).

* cited by examiner

RESONANT TYPE HIGH FREQUENCY POWER SUPPLY DEVICE AND SWITCHING CIRCUIT FOR RESONANT TYPE HIGH FREQUENCY POWER SUPPLY DEVICE

TECHNICAL FIELD

The present invention relates to a resonant type high frequency power supply device and a switching circuit for the resonant type high frequency power supply device that perform power transmission at a high frequency.

BACKGROUND ART

In a conventional resonant type high frequency power supply device shown in FIG. 15, a high frequency FET (Field Effect Transistor) for RF (Radio Frequency) is used as a power element Q1. Then, a drive circuit of transformer type 101 and an RF power amplifier circuit 102 are used to drive this high frequency FET, and a multi-output type power supply circuit 103 is further used to drive the RF power amplifier circuit 102 (for example, refer to non-patent reference 1).

RELATED ART DOCUMENT

Non-Patent Reference

Non-patent reference 1: Transistor Technology, February 2005, Chapter 13

SUMMARY OF THE INVENTION

Problems to be Solved by the Invention

However, in the conventional configuration disclosed by nonpatent reference 1, the drive circuit of transformer type 101 is used to drive the power element Q1, and a sign-wave AC voltage is applied as a Vgs drive signal of the power element Q1. Therefore, in a period when the power element Q1 is turned OFF, a negative voltage is applied to Vgs, and thus, a charge (Q=CV) corresponding to the negative voltage is accumulated in Cgs and Cgd that are parasitic capacitances of the power element Q1. Then, in order to turn on the power element Q1 at the next period, the accumulated charge has to be discharged once, and then charged at a positive voltage. Then, since switchings of the power element Q1 are performed by repeating the above operation, there is a problem such that a large amount of power for driving the power element Q1 is required.

In addition, the above-described drive operation also becomes a factor to delay the switching speed of the power element Q1. Therefore, it is connected to an increase of switching losses of the power element Q1. Thus, there is a problem such that the power consumption as the resonant type high frequency power supply device also becomes larger, which causes a reduction in the power conversion efficiency.

The present invention is made in order to solve the above-mentioned problems, and it is therefore an object of the present invention to provide a resonant type high frequency power supply device and a switching circuit for the resonant type high frequency power supply device that achieve high efficiency with low power consumption and that can operate at a high frequency exceeding 2 MHz, by driving a power element without using a drive circuit of transformer type.

Means for Solving the Problems

In accordance with the present invention, there is provided a resonant type high frequency power supply device provided with a power element that performs a switching operation, the power supply device including: a high frequency pulse drive circuit that transmits a pulse-shaped voltage signal having a high frequency exceeding 2 MHz to the power element to drive the power element, wherein a voltage signal from the high frequency pulse drive circuit is subjected to partial resonance by an impedance of a signal line of the voltage signal and a parasitic capacitance of the power element.

Advantages of the Invention

Because the resonant type high frequency power supply device in accordance with the present invention is configured as above, the resonant type high frequency power supply device achieves high efficiency with low power consumption, and can operate at a high frequency exceeding 2 MHz, by driving the power element without using a drive circuit of transformer type.

EMBODIMENTS OF THE INVENTION

Hereafter, the preferred embodiments of the present invention will be explained in detail with reference to the drawings.

Embodiment 1

Figure 1:
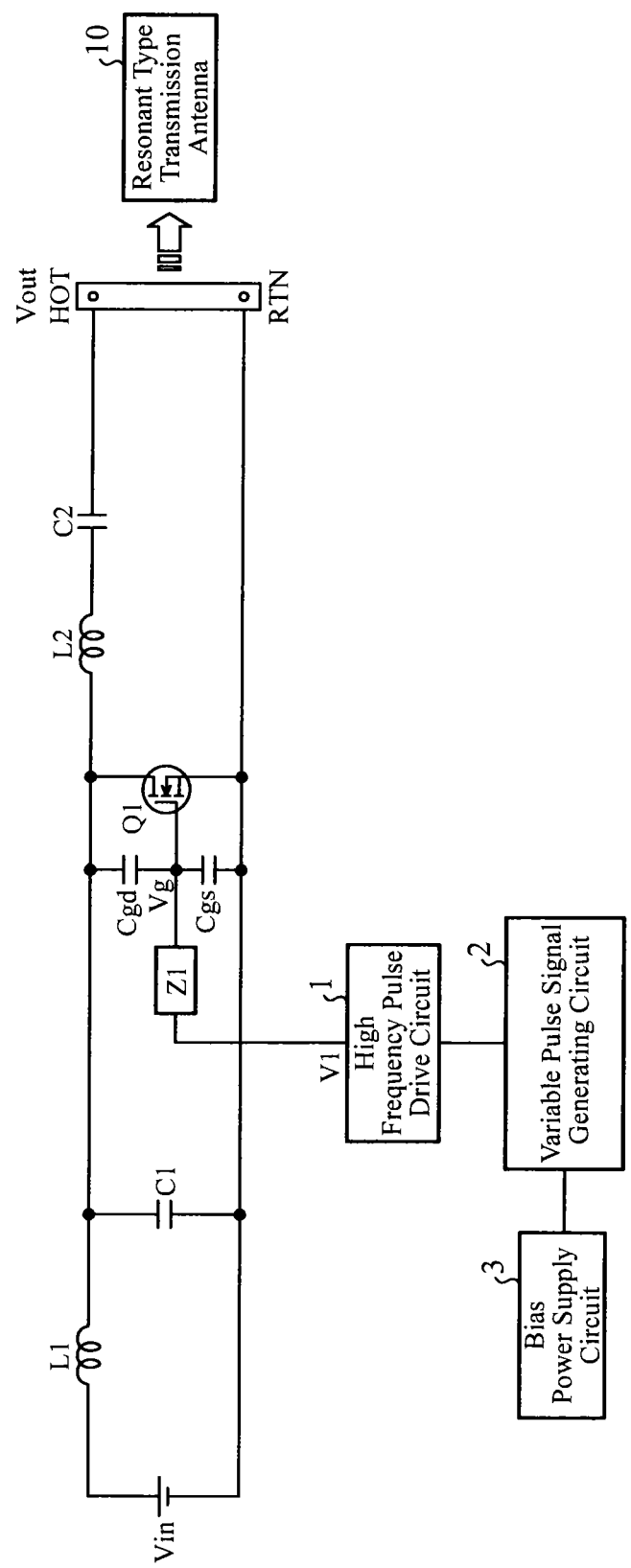
FIG. 1 is a diagram showing the configuration of a resonant type high frequency power supply device in accordance with Embodiment 1 of the present invention (in a case in which a power element has a single configuration)

FIG. 1 is a diagram showing the configuration of a resonant type high frequency power supply device in accordance with Embodiment 1 of the present invention. In FIG. 1, a power element Q1 represents a circuit in a case of a single configuration.

The resonant type high frequency power supply device is comprised of the power element Q1, a resonance circuit element (capacitors C1 and C2 and an inductor L2), an inductor L1, a high frequency pulse drive circuit 1, a variable pulse signal generating circuit 2 and a bias power supply circuit 3, as shown in FIG. 1. In addition, Cgs and Cgd are parasitic capacitances of the power element Q1 and Z1 is an impedance of signal lines (wires, patterns on a board, etc.) between the high frequency pulse drive circuit 1 and a G terminal of the power element Q1.

Additionally, a resonant type transmission antenna (a transmission antenna for power transmission) 10 is a resonant type antenna for power transmission having LC resonance characteristics (which is not limited only to a non-contact type one). This resonant type transmission antenna 10 can be of any of magnetic resonance type, electric resonance type, and electromagnetic induction type.

The power element Q1 is a switching element that performs a switching operation in order to convert a direct voltage Vin, which is an input, into an alternating voltage. As the power element Q1, not only an FET for RF but also an element, such as an Si-MOSFET, an SiC-MOSFET or a GaN-FET, can be used.

The resonance circuit element (the capacitors C1 and C2 and the inductor L2) is an element that causes the power element Q1 to perform resonant switching in the switching operation. By using this resonance circuit element which consists of the capacitors C1 and C2 and the inductor L2, the resonance condition can be caused to match that of the resonant type transmission antenna 10.

The inductor L1 serves to temporarily hold the energy of the direct voltage Vin, which is an input, every time when the power element Q1 performs the switching operation.

The high frequency pulse drive circuit 1 is a circuit that transmits a pulse-shaped voltage signal having a high frequency exceeding 2 MHz to the G terminal of the power element Q1, to drive the power element Q1. On this occasion, the voltage signal from the high frequency pulse drive circuit 1 is subjected to partial resonance by using the impedance Z1 of the signal lines of the voltage signal and the parasitic capacitances (Cgs+Cgd) of the power element Q1, and then inputs the resultant to the G terminal of the power element Q1. The high frequency pulse drive circuit 1 is a circuit whose output part is configured to have a totem pole circuit configuration by using an FET element or the like in such a way as to be able to perform a high-speed ON/OFF output operation.

The variable pulse signal generating circuit 2 is a circuit that transmits a pulse-shaped voltage signal having a high frequency exceeding 2 MHz, such as a logic signal, to the high frequency pulse drive circuit 1, to drive the high frequency pulse drive circuit 1. The variable pulse signal generating circuit 2 is comprised of an oscillator for frequency setting and logic ICs such as an inverter and a flip-flop, and has functions such as a function of changing a pulse width and a function of outputting reverse pulses.

The bias power supply circuit 3 supplies driving power to both the variable pulse signal generating circuit 2 and the high frequency pulse drive circuit 1.

Next, the operation of the resonant type high frequency power supply device configured as above will be explained.

First, the direct voltage Vin which is an input is applied to a D connector of the power element Q1 byway of the inductor L1. The power element Q1 then converts the voltage into a positive voltage in an alternating form by performing the ON/OFF switching operation. At the time of this conversion operation, the inductor L1 serves to temporarily hold the energy, thereby helping the conversion of the direct voltage to the alternating voltage.

In this embodiment, in the switching operation of the power element Q1, in order to make a switching loss due to the product of an Ids current and a Vds voltage become the smallest, a condition imposed on the resonant switching is set by means of the resonance circuit element which consists of the capacitors C1 and C2 and the inductor L2 in such a way that ZVS (zero voltage switching) is realized. By performing this resonant switching operation, the alternating voltage centered on an RTN voltage is outputted as an output voltage Vout.

The driving of the power element Q1 is performed by inputting the pulse-shaped voltage signal, which the high frequency pulse drive circuit 1 which has received the arbitrary pulse-shaped voltage signal from the variable pulse signal generating circuit 2 outputs, to the G terminal of the power element Q1.

Figure 2:
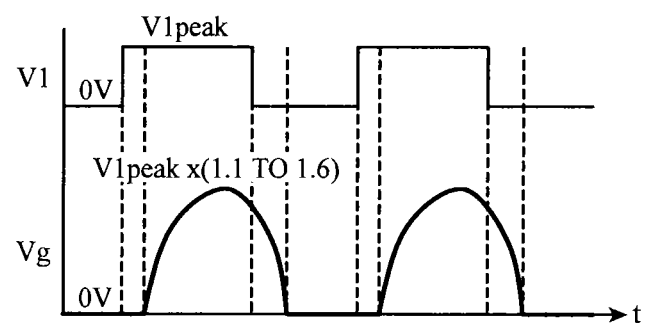
FIG. 2 is a diagram showing the relationship between a V1 waveform and a Vg waveform according to the resonant type high frequency power supply device in accordance with Embodiment 1 of the present invention.

At that time, the voltage Vg of the G terminal of the power element Q1 becomes a partial resonance waveform as shown in FIG. 2 due to a transient response by the impedance Z1 and the parasitic capacitances (Cgs+Cgd), and a peak voltage thereof is a voltage higher than a V1 voltage, to be applied to the G terminal of the power element Q1. In this manner, it is made possible to drive the power element Q1 at high speed and low ON resistance.

In addition, the driving frequency of the power element Q1 serves as the operating frequency of the resonant type high frequency power supply device, and is determined by a setting made on the oscillator circuit disposed in the variable pulse signal generating circuit 2.

As mentioned above, in accordance with Embodiment 1, because the resonant type high frequency power supply device is configured to comprise the high frequency pulse drive circuit 1 that transmits the pulse-shaped voltage signal having the high frequency exceeding 2 MHz to the power element Q1 to drive the power element, wherein the voltage signal from the high frequency pulse drive circuit 1 is subjected to partial resonance by the impedance Z1 of the signal lines of the voltage signal and the parasitic capacitances (Cgs+Cgd) of the power element Q1, by virtue of the partial resonance, the voltage Vg of the G terminal of the power element Q1 can be made higher than the voltage V1, and the voltage Vg can also be formed in a half wave sine waveform; thus, in the resonant type high frequency power supply device that performs a high frequency operation exceeding 2 MHz, without using a drive circuit of transformer type 101 for use in a conventional technology, 90% or more high power conversion efficiency characteristics can be provided with low power consumption. In addition, simplification, downsizing and a cost reduction of the device can be achieved.

Figure 3:
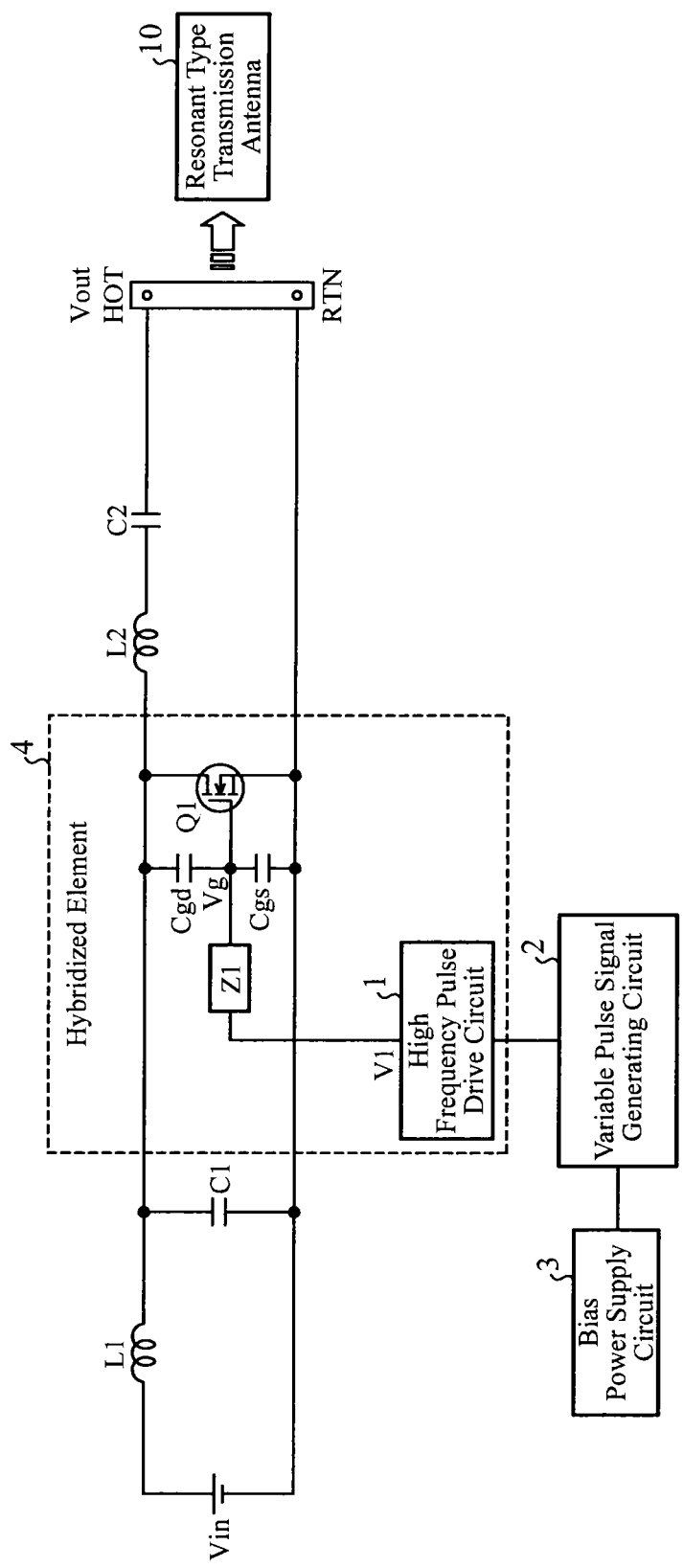
FIG. 3 is a diagram showing another example of the configuration of the resonant type high frequency power supply device in accordance with Embodiment 1 of the present invention (in a case in which a hybridized element is used)
Figure 4:
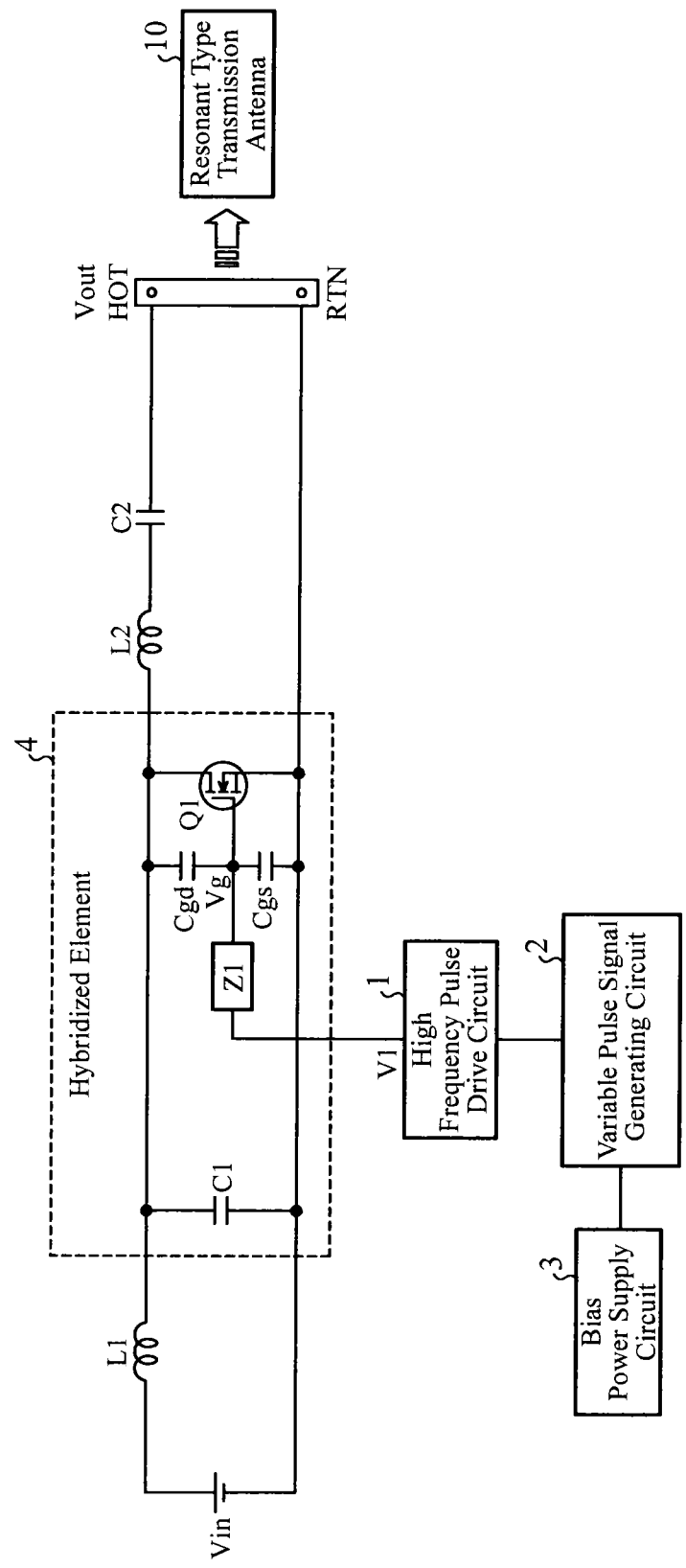
FIG. 4 is a diagram showing another example of the configuration of the resonant type high frequency power supply device in accordance with Embodiment 1 of the present invention (in a case in which a hybridized element is used)
Figure 5:
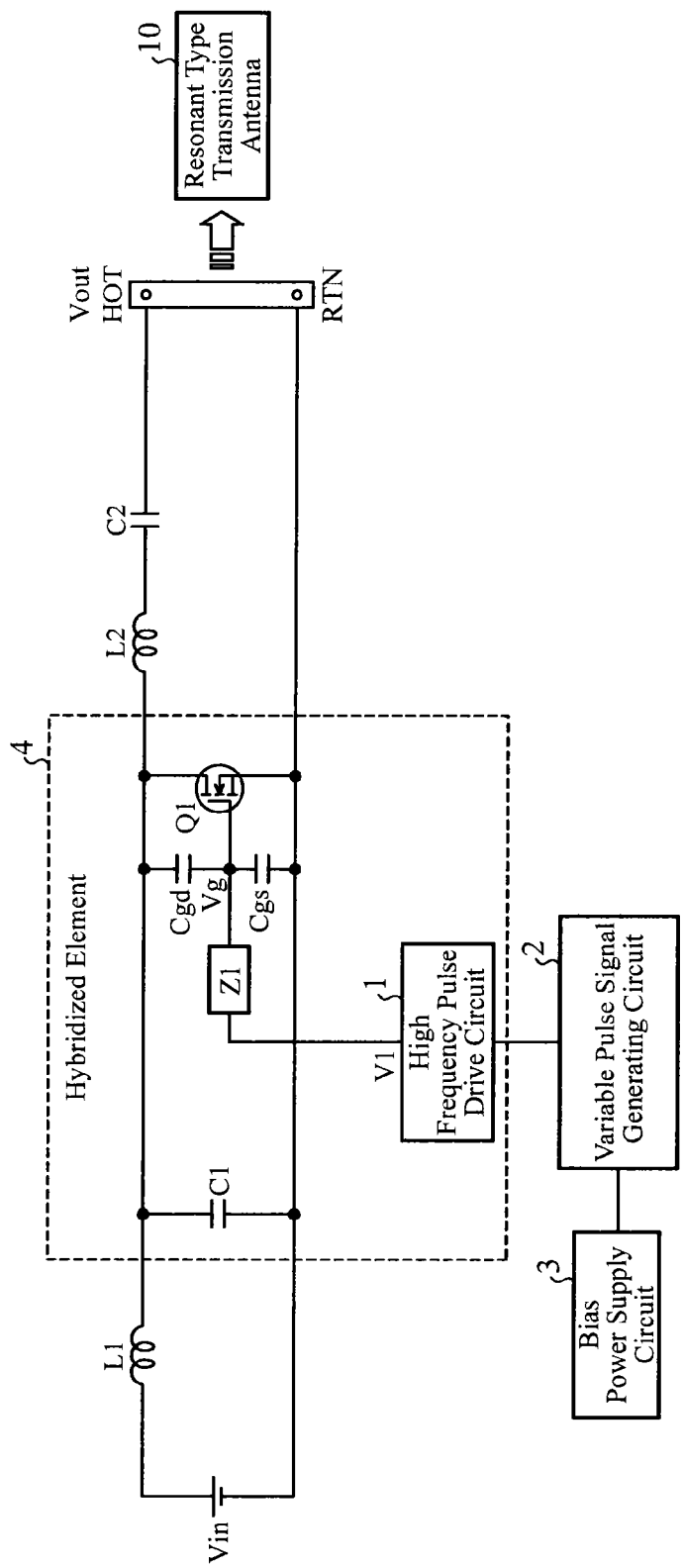
FIG. 5 is a diagram showing another example of the configuration of the resonant type high frequency power supply device in accordance with Embodiment 1 of the present invention (in a case in which a hybridized element is used)
Figure 6:
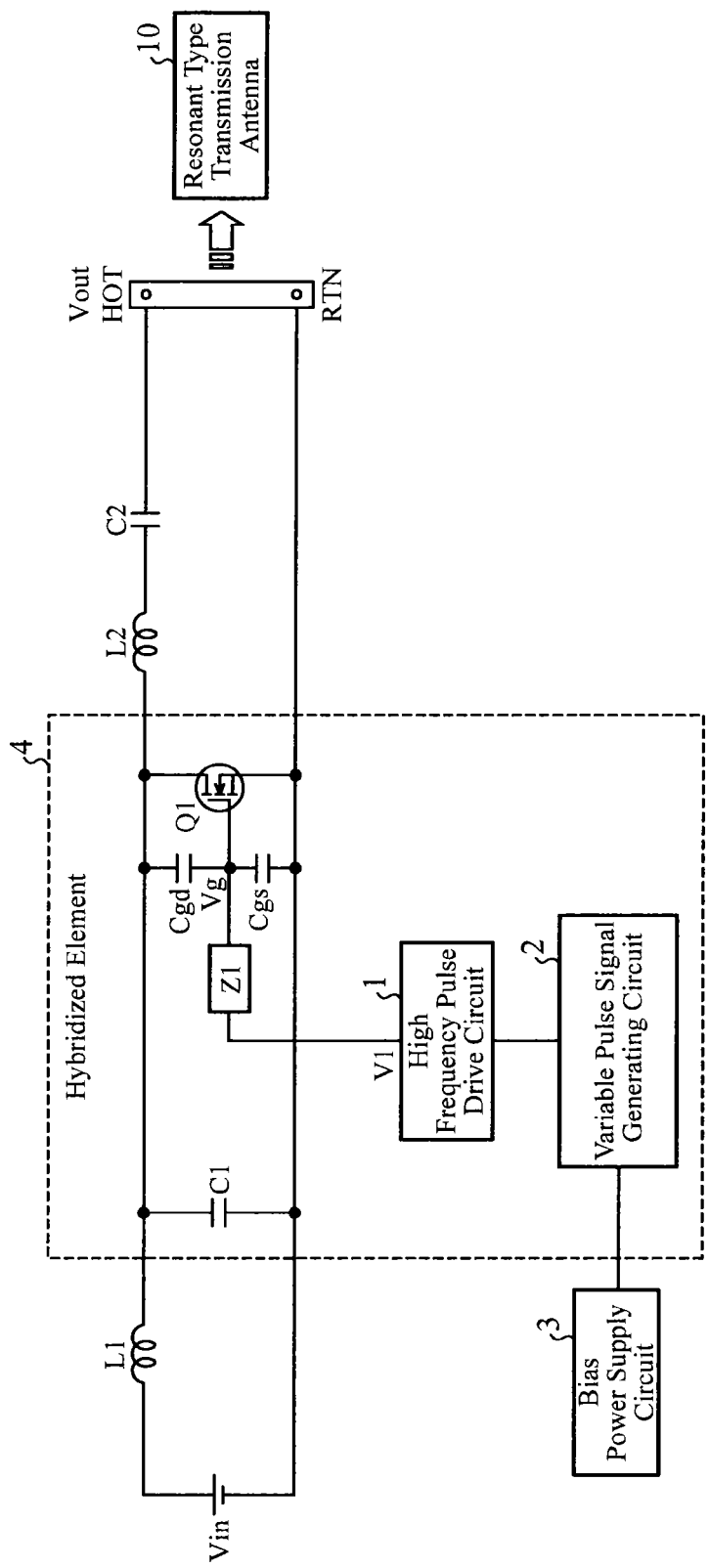
FIG. 6 is a diagram showing another example of the configuration of the resonant type high frequency power supply device in accordance with Embodiment 1 of the present invention (in a case in which a hybridized element is used)
Figure 7:
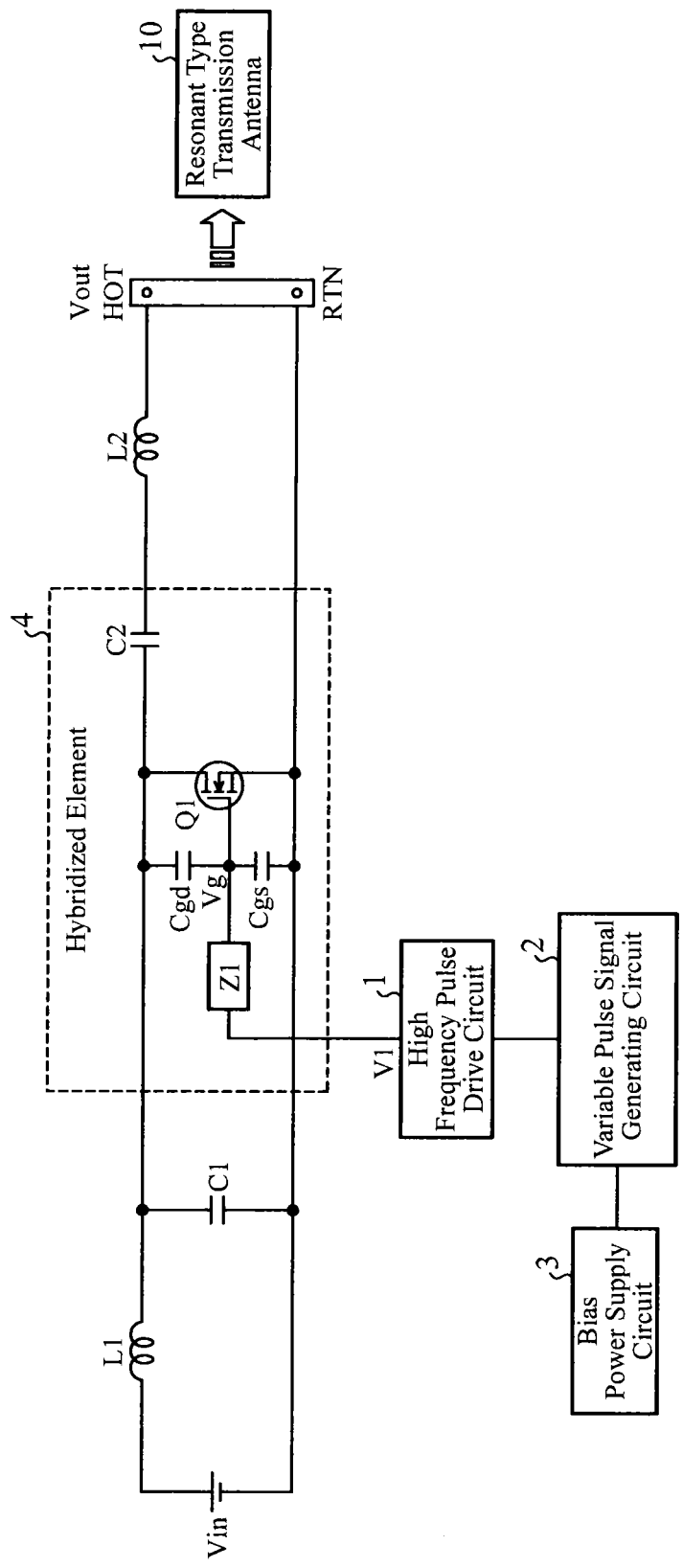
FIG. 7 is a diagram showing another example of the configuration of the resonant type high frequency power supply device in accordance with Embodiment 1 of the present invention (in a case in which a hybridized element is used)
Figure 8:
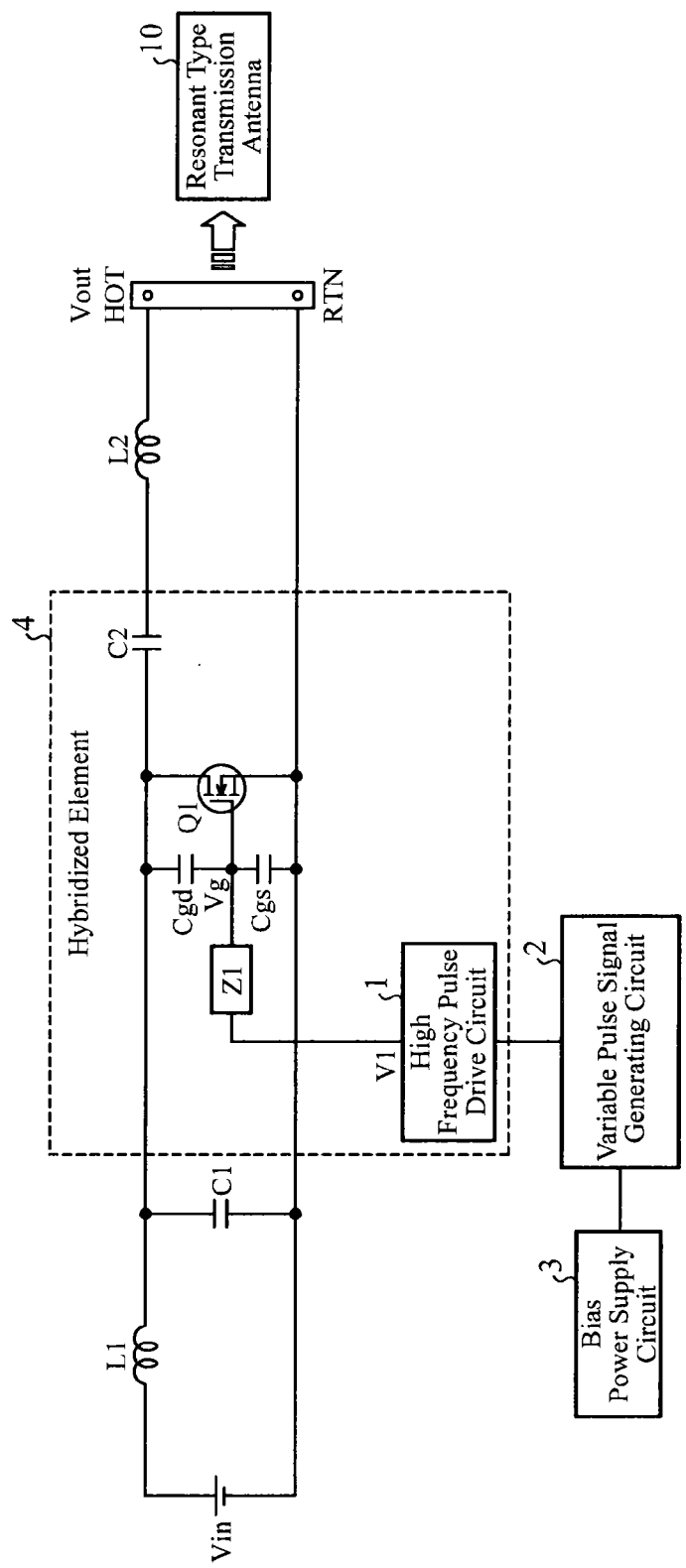
FIG. 8 is a diagram showing another example of the configuration of the resonant type high frequency power supply device in accordance with Embodiment 1 of the present invention (in a case in which a hybridized element is used)
Figure 9:
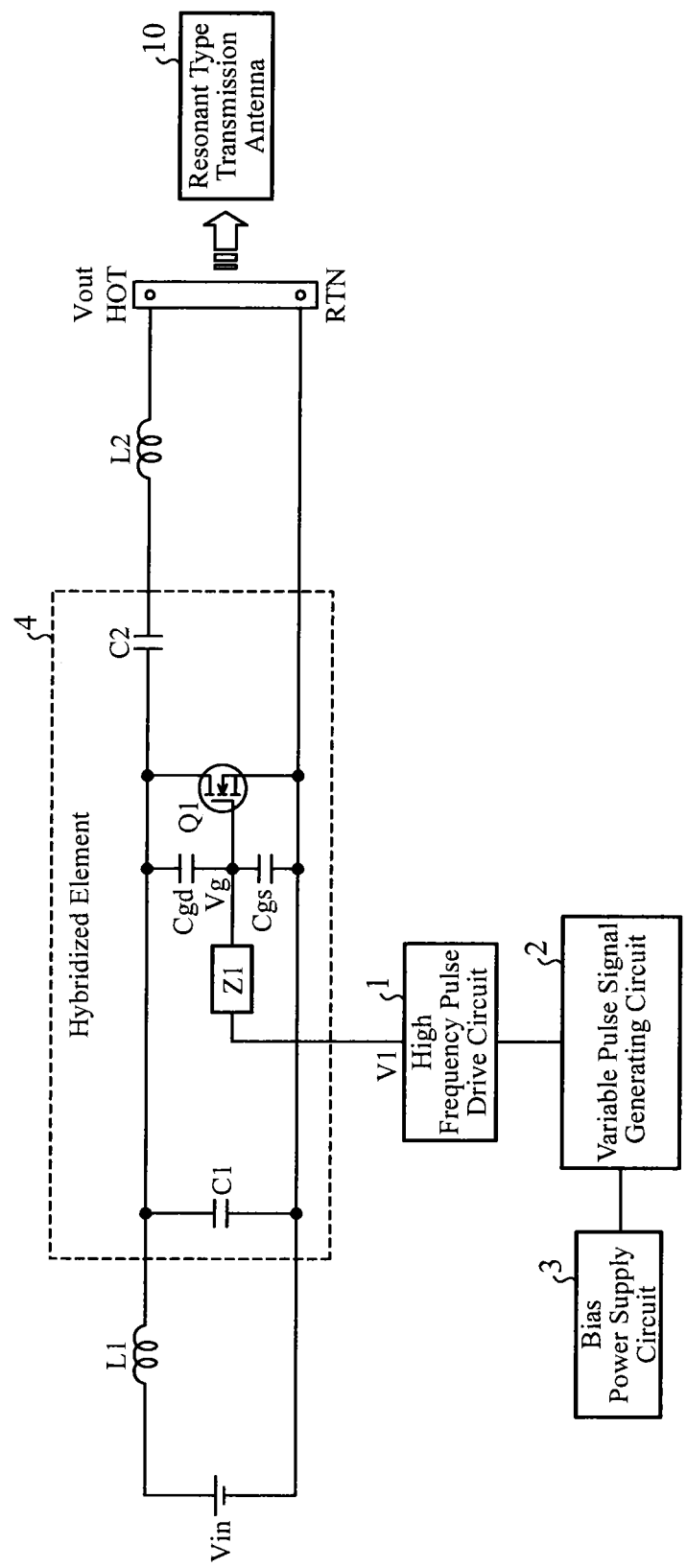
FIG. 9 is a diagram showing another example of the configuration of the resonant type high frequency power supply device in accordance with Embodiment 1 of the present invention (in a case in which a hybridized element is used)
Figure 10:
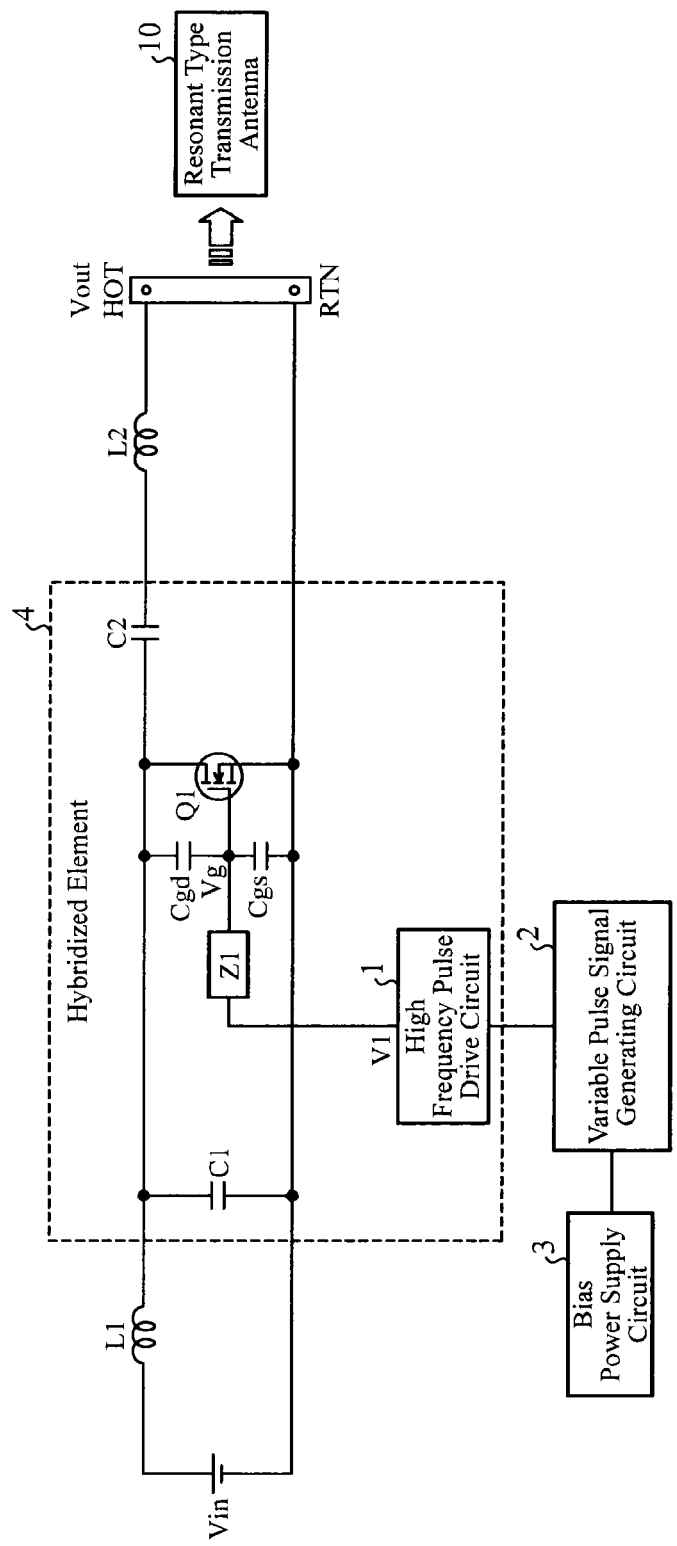
FIG. 10 is a diagram showing another example of the configuration of the resonant type high frequency power supply device in accordance with Embodiment 1 of the present invention (in a case in which a hybridized element is used)
Figure 11:
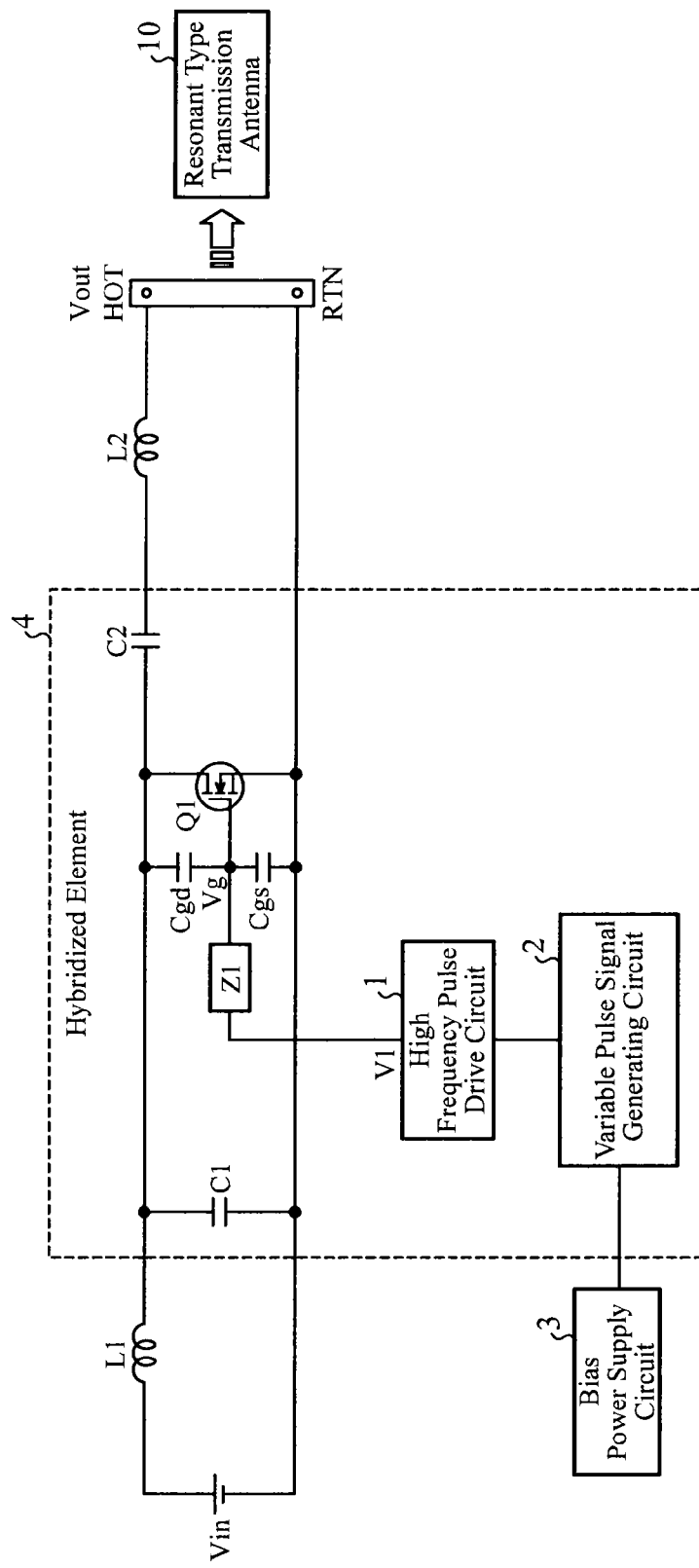
FIG. 11 is a diagram showing another example of the configuration of the resonant type high frequency power supply device in accordance with Embodiment 1 of the present invention (in a case in which a hybridized element is used)

In the example shown in FIG. 1, an element (a switching circuit for the resonant type high frequency power supply device) 4 in which some components are hybridized can be used. FIG. 3 shows an element 4 in which the power element Q1, the impedance Z1, and the high frequency pulse drive circuit 1 are hybridized, FIG. 4 shows an element 4 in which the power element Q1, the impedance Z1, and the capacitor C1 are hybridized, FIG. 5 shows an element 4 in which the power element Q1, the impedance Z1, the capacitor C1, and the high frequency pulse drive circuit 1 are hybridized, FIG. 6 shows an element 4 in which the power element Q1, the impedance Z1, the capacitor C1, the high frequency pulse drive circuit 1, and the variable pulse signal generating circuit 2 are hybridized, FIG. 7 shows an element 4 in which the power element Q1, the impedance Z1, and the capacitor C2 are hybridized, FIG. 8 shows an element 4 in which the power element Q1, the impedance Z1, the capacitor C2, and the high frequency pulse drive circuit 1 are hybridized, FIG. 9 shows an element 4 in which the power element Q1, the impedance Z1, and the capacitors C1 and C2 are hybridized, FIG. 10 shows an element 4 in which the power element Q1, the impedance Z1, the capacitors C1 and C2, and the high frequency pulse drive circuit 1 are hybridized, and FIG. 11 shows an element 4 in which the power element Q1, the impedance Z1, the capacitors C1 and C2, the high frequency pulse drive circuit 1, and the variable pulse signal generating circuit 2 are hybridized.

Figure 12:
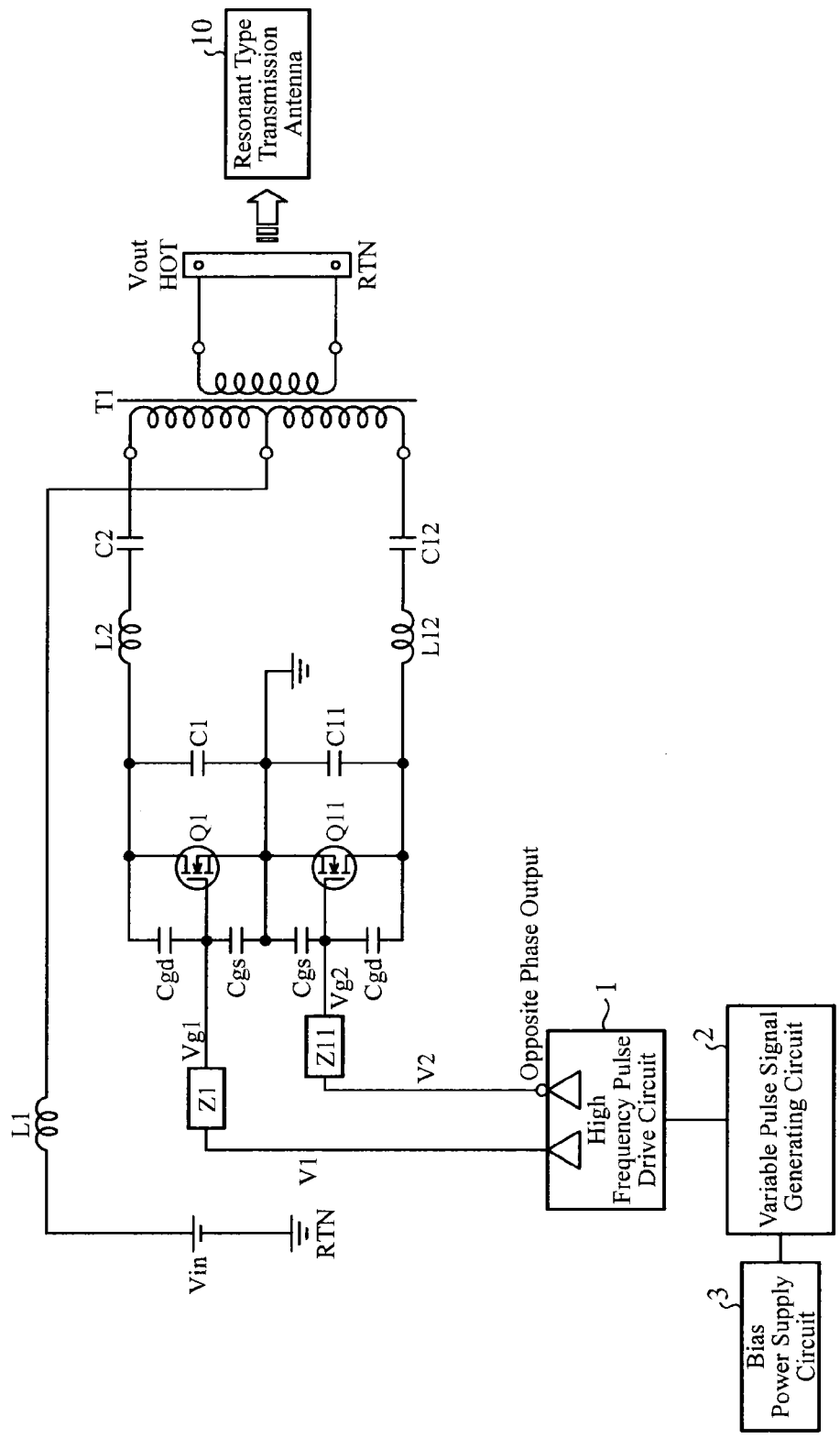
FIG. 12 is a diagram showing another example of the configuration of the resonant type high frequency power supply device in accordance with Embodiment 1 of the present invention (in a case in which the power element has a push-pull configuration)

Further, although the circuit in the case in which the power element Q1 has a single configuration is shown in FIG. 1, this embodiment is not limited to this example. For example, as shown in FIG. 12, the present invention can be similarly applied to a case in which the power element Q1 has a push-pull configuration.

Figure 13:
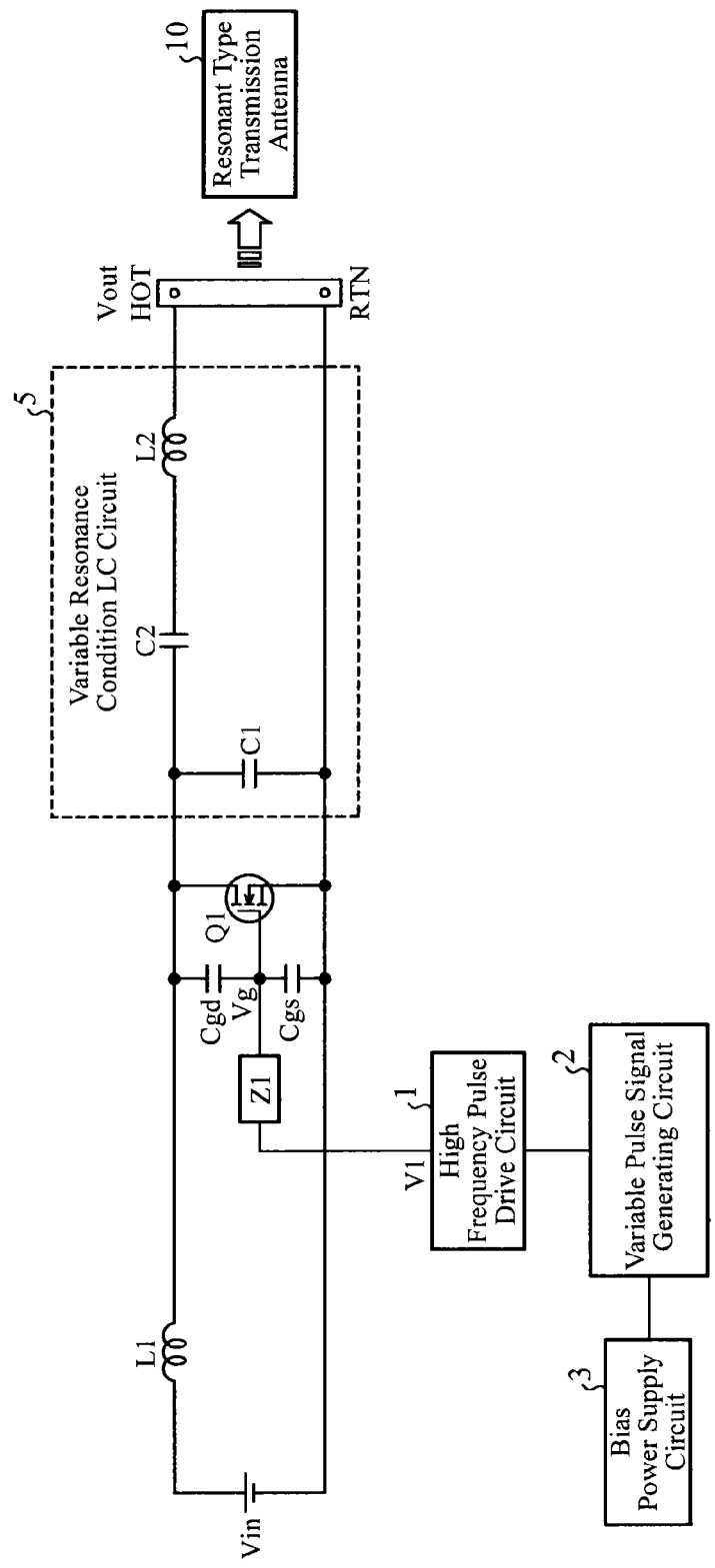
FIG. 13 is a diagram showing another example of the configuration of the resonant type high frequency power supply device in accordance with Embodiment 1 of the present invention (in a case in which a variable resonance condition LC circuit is disposed)
Figure 14:
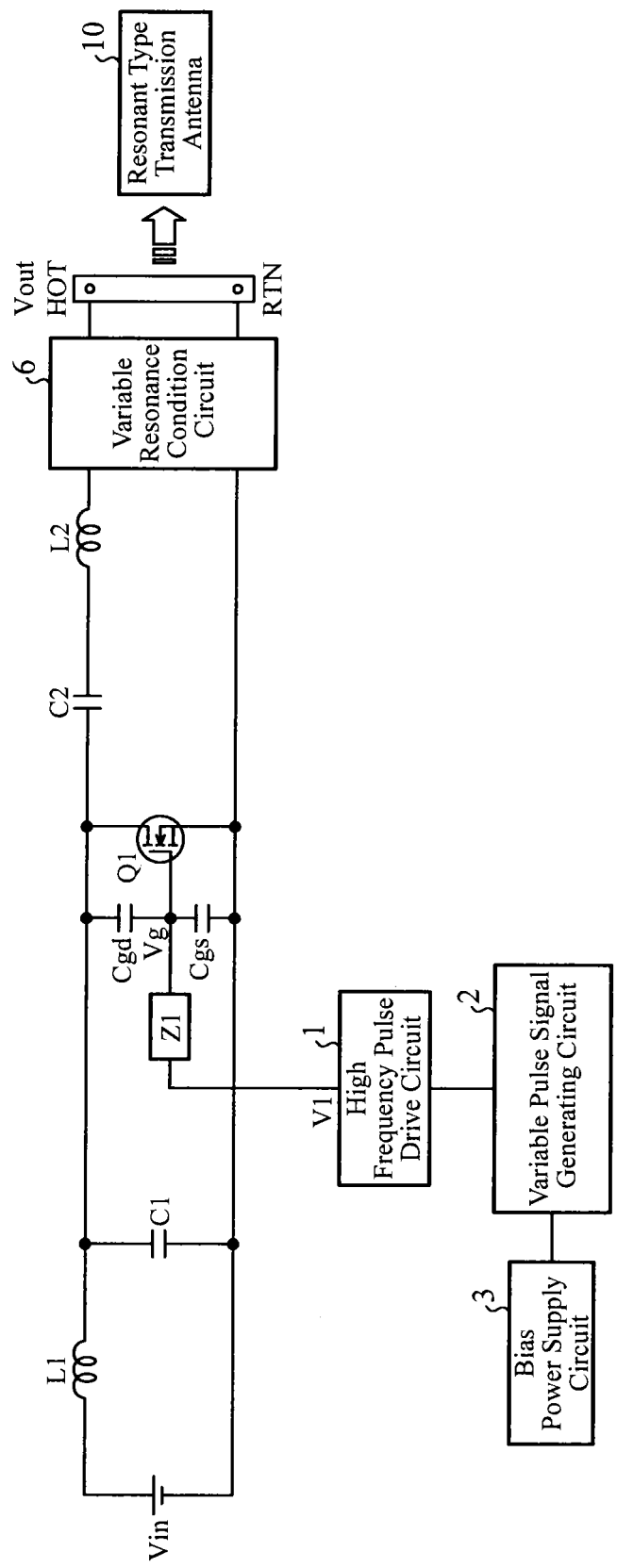
FIG. 14 is a diagram showing another example of the configuration of the resonant type high frequency power supply device in accordance with Embodiment 1 of the present invention (in a case in which a variable resonance condition circuit is disposed)
Figure 15:
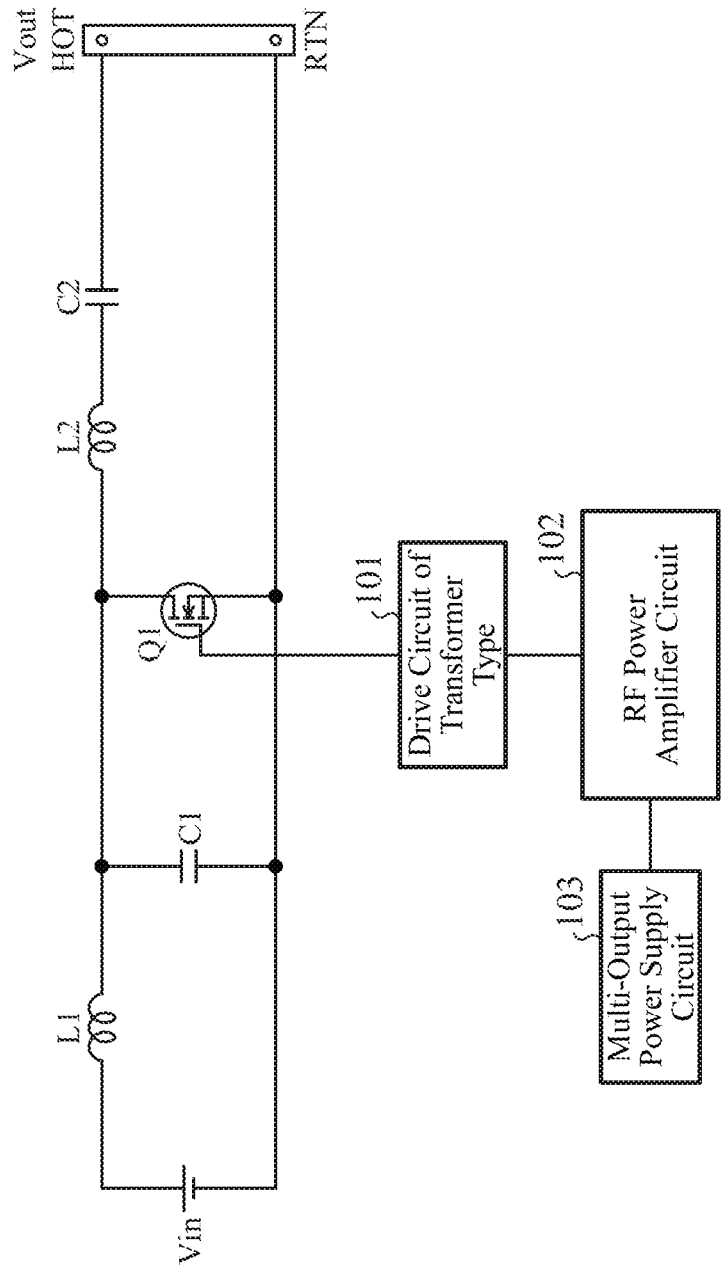
FIG. 15 is a diagram showing the configuration of a conventional resonant type high frequency power supply device.

Further, although the explanation about FIG. 1 is made by assuming that the constants of the resonance circuit element (the capacitors C1 and C2 and the inductor L2) are fixed and hence the resonance condition is fixed, this embodiment is not limited to this example. For example, as shown in FIG. 13, a variable resonance condition LC circuit 5 that causes the resonance condition to be variable can be alternatively used. Further, for example, as shown in FIG. 14, a variable resonance condition circuit 6 that causes the resonance condition according to the above-mentioned resonance circuit element (the capacitors C1 and C2 and the inductor L2) to be variable can be disposed separately.

Further, while the invention has been described in its preferred embodiment, it is to be understood that various changes can be made in an arbitrary component in accordance with the embodiment, and an arbitrary component in accordance with the embodiment can be omitted within the scope of the invention.

INDUSTRIAL APPLICABILITY

The resonant type high frequency power supply device and the switching circuit for the resonant type high frequency power supply device in accordance with the present invention achieve high efficiency with low power consumption, and can operate at a high frequency exceeding 2 MHz, by driving the power element without using a drive circuit of transformer type, and they are suitable for use as a resonant type high frequency power supply device and a switching circuit for the resonant type high frequency power supply device that perform power transmission at a high frequency, etc.

EXPLANATIONS OF REFERENCE NUMERALS

1 high frequency pulse drive circuit, 2 variable pulse signal generating circuit, 3 bias power supply circuit, 4 hybridized element (switching circuit for resonant type high frequency power supply device), 5 variable resonance condition LC circuit, 6 variable resonance condition circuit, and 10 resonant type transmission antenna (transmission antenna for power transmission).

The invention claimed is:

1. A high frequency power supply device, comprising: a power element that performs a switching operation, said power element having a gate terminal and a parasitic capacitance: and a high frequency pulse drive circuit that generates a pulse-shaped voltage signal for driving the gate of said power element through a connection having an impedance, said pulse-shaped voltage signal having a high frequency exceeding 2 MHz, wherein a peak of a voltage signal applied to said gate terminal is higher than an amplitude of said pulse-shaped voltage signal generated by said high frequency pulse drive circuit due to the parasitic capacitance of said power element and the impedance of the connection between said high frequency pulse drive circuit and said gate terminal; wherein: said parasitic capacitance and said impedance cause said pulse-shaped voltage signal to resonate so that said peak of said voltage signal applied to said gate terminal becomes higher than said amplitude of said pulse-shaped voltage signal generated by said high frequency pulse drive circuit.

2. The high frequency power supply device according to claim 1, wherein:
said power element is a Si-MOSFET, a SiC-MOSFET or a GaN-FET.

3. The high frequency power supply device according to claim 1, wherein:

said power element includes a push-pull type configuration or a single type configuration.

4. The high frequency power supply device according to claim 1, wherein:
said voltage signal applied to said gate terminal includes a half wave sine waveform due to said parasitic capacitance and said impedance.

5. The high frequency power supply device according to claim 1, wherein
said impedance is an impedance of the connection which is a signal line that connects said high frequency pulse drive circuit with said gate terminal.

6. The high frequency power supply device according to claim 1, said device further comprising:
a matching circuit that has an inductor and a condenser, at least one of said inductor and said condenser is variable-type.

7. A switching circuit for a high frequency power supply device, said switching circuit comprising: a power element that performs a switching operation and being used for the high frequency power supply device, said power element including a gate terminal and a parasitic capacitance; and a high frequency pulse drive circuit that generates a pulse-shaped voltage signal for driving said power element through a connection having an impedance, said pulse-shaped voltage signal having a high frequency exceeding 2 MHz, wherein a peak of a voltage signal applied to said gate terminal is higher than an amplitude of said pulse-shaped voltage signal generated by said high frequency pulse drive circuit due to the parasitic capacitance of said power element and the impedance of the connection between said high frequency pulse drive circuit and said gate terminal; wherein: said parasitic capacitance and said impedance cause said pulse-shaped voltage signal to resonate so that said peak of said voltage signal applied to said gate terminal becomes higher than said amplitude of said pulse-shaped voltage signal generated by said high frequency pulse drive circuit.

8. The switching circuit for the high frequency power supply device according to claim 7, wherein:
said voltage signal applied to said gate terminal includes a half wave sine waveform due to said parasitic capacitance and said impedance.

9. The switching circuit for the high frequency power supply device according to claim 7, wherein:
said impedance is an impedance of the connection which is a signal line that connects said high frequency pulse drive circuit with said gate terminal.

10. The switching circuit for the high frequency power supply device according to claim 7, wherein said switching circuit further comprises:
a capacitor that causes a resonance condition to match that of a transmission antenna for power transmission.

11. The switching circuit for the high frequency power supply device according to claim 7, wherein:
the parasitic capacitance of said power element includes a gate to source capacitance of said power element, and a gate to drain capacitance of said power element.

12. The high frequency power supply device according to claim 1, wherein:
the parasitic capacitance of said power element includes a gate to source capacitance of said power element, and a gate to drain capacitance of said power element.

* * * * *